United States Patent
Sako

(10) Patent No.: US 7,657,032 B2
(45) Date of Patent: Feb. 2, 2010

(54) DATA OUTPUTTING METHOD, RECORDING METHOD AND APPARATUS, REPRODUCING METHOD AND APPARATUS, AND DATA TRANSMITTING METHOD AND RECEIVING METHOD

(75) Inventor: Yoichiro Sako, Tokyo (JP)

(73) Assignee: Sony Corporation (JP)

( * ) Notice: Subject to any disclaimer, the term of this patent is extended or adjusted under 35 U.S.C. 154(b) by 1160 days.

(21) Appl. No.: 10/416,385

(22) PCT Filed: Sep. 19, 2002

(86) PCT No.: PCT/JP02/09609

§ 371 (c)(1),
(2), (4) Date: May 9, 2003

(87) PCT Pub. No.: WO03/028027

PCT Pub. Date: Apr. 3, 2003

(65) Prior Publication Data

US 2004/0028231 A1    Feb. 12, 2004

(30) Foreign Application Priority Data

Sep. 21, 2001    (JP) .............................. 2001-289982

(51) Int. Cl.
*H04N 7/167* (2006.01)

(52) U.S. Cl. ................. 380/239; 380/203; 380/210; 713/160; 713/187; 726/26

(58) Field of Classification Search ............... 726/26; 380/239
See application file for complete search history.

(56) References Cited

U.S. PATENT DOCUMENTS

| | | | | |
|---|---|---|---|---|
| 5,602,920 A | * | 2/1997 | Bestler et al. | 380/212 |
| 5,684,876 A | * | 11/1997 | Pinder et al. | 380/37 |
| 5,787,179 A | * | 7/1998 | Ogawa et al. | 380/46 |
| 6,363,212 B1 | * | 3/2002 | Fujinami et al. | 386/104 |
| 6,453,304 B1 | * | 9/2002 | Manabu et al. | 705/57 |
| 6,804,453 B1 | * | 10/2004 | Sasamoto et al. | 386/94 |
| 6,865,747 B1 | * | 3/2005 | Mercier | 725/94 |
| 7,031,942 B2 | * | 4/2006 | Ogino et al. | 705/51 |
| 2001/0005399 A1 | * | 6/2001 | Kimoto | 375/240.27 |
| 2002/0114359 A1 | * | 8/2002 | Ibaraki et al. | 370/535 |

FOREIGN PATENT DOCUMENTS

| | | |
|---|---|---|
| JP | 08-056356 A | 2/1996 |
| JP | 08-273296 A1 | 10/1996 |
| JP | 2001-016196 A | 1/2001 |
| JP | 2001-075474 A | 3/2001 |
| JP | 2002-042424 A | 2/2002 |

* cited by examiner

*Primary Examiner*—Emmanuel L Moise
*Assistant Examiner*—Shewaye Gelagay
(74) *Attorney, Agent, or Firm*—Lerner, David, Littenberg, Krumholz & Mentlik, LLP

(57) ABSTRACT

A data outputting method, including the steps of converting input data into sector unit data that starts with a start code and a header preceded by the start code, the header being composed of two bits, at least one of which represents an encryption control; when the converted data is to be encrypted, setting at least one of the two bits preceded by the start code to a state that represents that the data has been encrypted; encrypting the converted data; encoding the encrypted data; and outputting the encoded data.

4 Claims, 8 Drawing Sheets

| | a1 | a2 | DEFINITION |
|---|---|---|---|
| MPEG1 | 0 | 0 | NON-ENCRYPTED |
| | 1 | 0 | ENCRYPTED |
| MPEG2 | 0 | 1 | NON-ENCRYPTED |
| | 1 | 1 | ENCRYPTED |

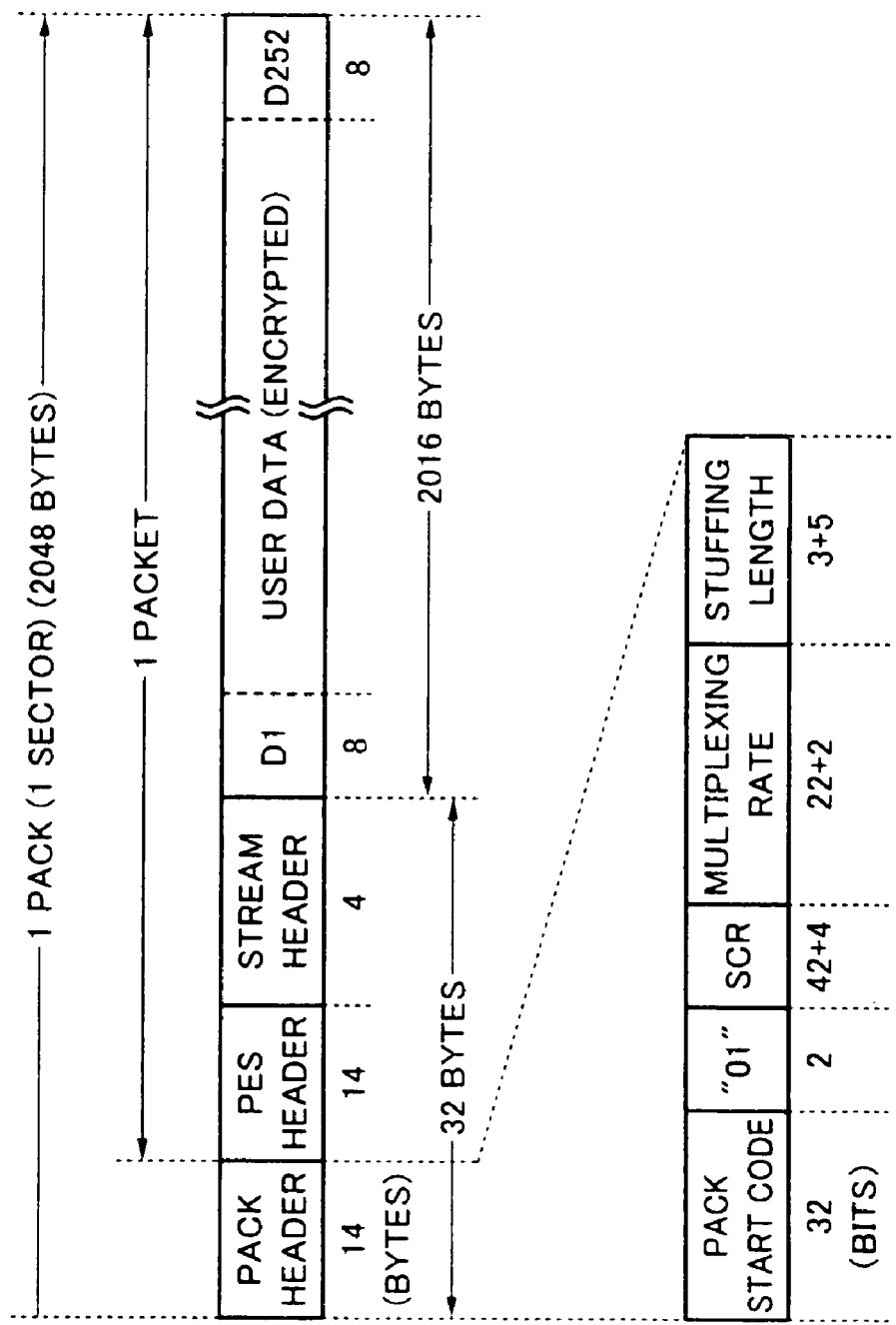

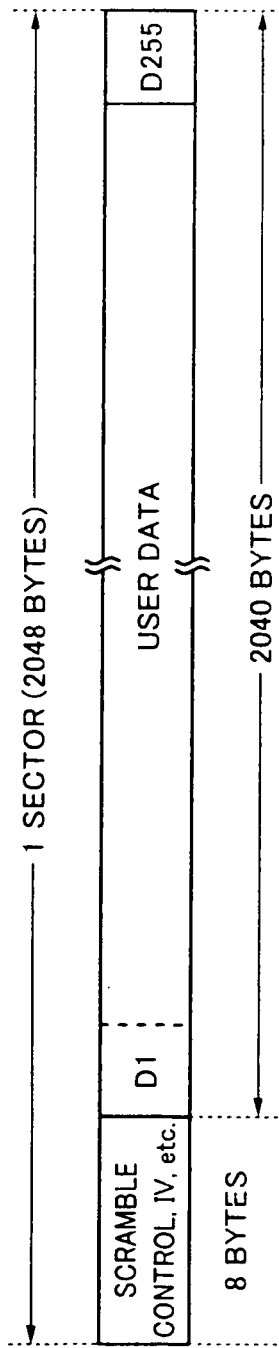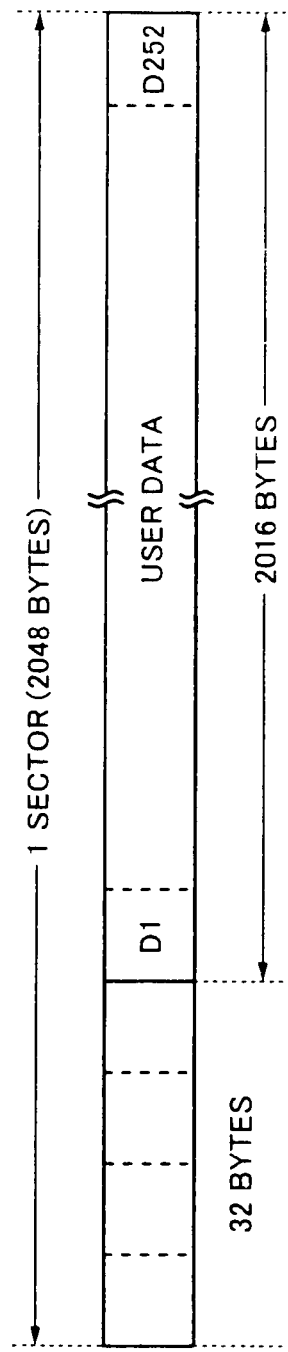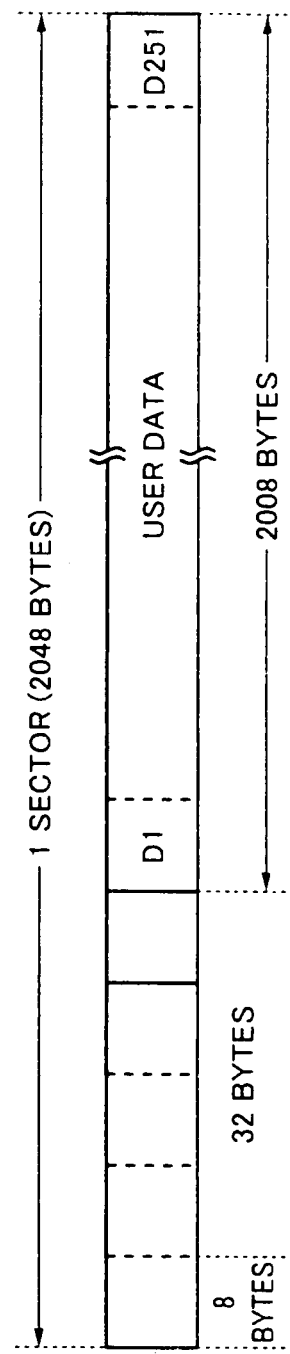

Fig. 5A

|  | a1 | a2 | DEFINITION |
|---|---|---|---|
| MPEG1 | 0 | 0 | NON-ENCRYPTED |
|  | 1 | 0 | ENCRYPTED |
| MPEG2 | 0 | 1 | NON-ENCRYPTED |
|  | 1 | 1 | ENCRYPTED |

Fig. 5B

| a1 | a2 | DEFINITION |
|---|---|---|
| 0 | 0 | Reserved |
| 0 | 1 | NON-ENCRYPTED |
| 1 | 0 | ENCRYPTION 2 |
| 1 | 1 | ENCRYPTION 1 |

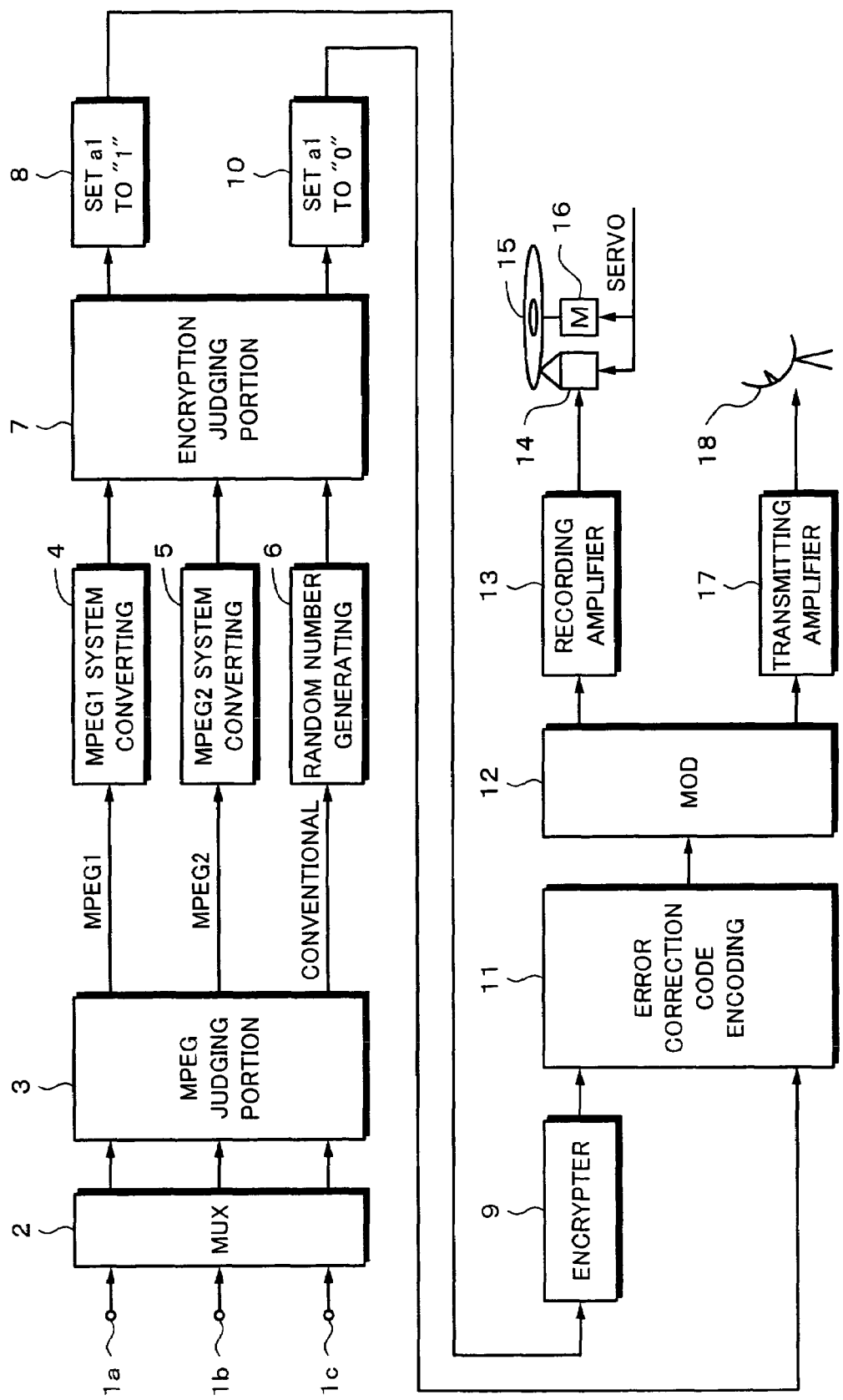

DATA OUTPUTTING METHOD, RECORDING METHOD AND APPARATUS, REPRODUCING METHOD AND APPARATUS, AND DATA TRANSMITTING METHOD AND RECEIVING METHOD

TECHNICAL FIELD

The present invention relates to a data outputting method, a recording method and apparatus, a reproducing method and apparatus, and a data transmitting method and receiving method that allow different data formats to be merged.

BACKGROUND ART

In a hard disk drive, a floppy (trademark) disk drive, CD-ROM/CD-R/CD-RW disc drives, and so forth, which are external storing apparatuses for personal computers, data is processed in the unit of a sector. For example, the size of one sector is 2 Kbytes (2048 bytes). To protect the copyright of contents, contents data is encrypted and recorded. To encrypt contents data in the unit of a sector, each sector requires an encryption control bit. In the CBC (Chaining Block Ciphering) mode, an IV (Initial Vector: encryption initial value) is required.

As a transmitting or recording format for multimedia contents data, the MPEG (Moving Picture Experts Group) is known. FIG. 1A shows a data structure of a program stream corresponding to the MPEG2 system. One program starts with a pack header and ends with an end code. Generally, a pack is composed of a plurality of packets. A system header is added to the top pack. The system header is optionally added to the later packets. A pack header is added at the beginning of each pack.

As shown in FIG. 1A, the pack header is composed of a pack start code (32 bits), an identification code (2 bits), an SCR (System Clock Reference: system time reference value) (42+4 bits), a multiplexing rate (22+2 bits) that represents the bit rate of the stream, a stuffing length (3+8 bits), and a stuffing byte (8×M bits). The stuffing byte is dummy data used to keep for example the packet data length constant. Thus, the stuffing byte does not have meaningful information.

FIG. 1B shows the structure of a packet. At the beginning is a packet start code (32 bits) placed. The packet start code is composed of a beginning start code and a stream ID (8 bits). The packet start code is followed by a packet length (16 bits) that represents the data length of a packet. A control code (2 bits) is "01" in the MPEG2 system. The first two bits of a flag and control (14 bits) are used for a PES (Packetized Elementary Stream) scramble control. A PES header length (8 bits) represents the header length. Corresponding to the flag and control, conditional coding items are placed. The conditional coding items contains a PTS (Presentation Time Stamp) (33+7 bits), a DTS (Decoding Time Stamp) (33+7 bits), and data of other codes. In addition, a stuffing byte (8×M bits) is added. The stuffing byte is followed by packet data (8×N bits).

FIG. 2 shows a data structure for 2 Kbytes in the MPEG2 system to be merged with the data format of a conventional application with a sector length of 2 Kbytes (2048 bytes) (hereinafter sometimes referred to as conventional data format). As shown in FIG. 2, one pack is composed of one packet. The size of one pack is 2 Kbytes. Thus, one pack is equivalent to one sector of the conventional format. At the top of one pack is a pack header (14 bytes) placed. The pack header is followed by a PES header (14 bytes), a stream header (4 bytes), and user data (2016 bytes) in the order.

When the user data is divided in the unit of eight bytes, the user data (or packet) is composed of D1 to D252. The user data is for example audio data that has been compression-encoded and encrypted. Thus, the data structure shown in FIG. 2 satisfies the MPEG2 system coding rule.

Although the pack header shown in FIG. 2 is the same as that shown in FIG. 1A, since the pack header shown in FIG. 2 does not contain a stuffing byte, the length thereof is 14 bytes. In other words, the pack header is composed of a pack start code (32 bits), a control code (2 bits), an SCR (42+4 bits), a multiplexing rate (22+2 bits) that represents the bit rate of the stream, and a stuffing length (3+5 bits), which is a total of 112 bits (=14 bytes). The stuffing byte is not added so as to prevent the stuffing byte from varying the position of the scramble control bit.

Although the PES header shown in FIG. 2 is the same as that shown in FIG. 1B, the PES header shown in FIG. 2 is composed of a packet start code (32 bits), a packet length (16 bits), a two-bit control code, a flag and control (14 bits), a PES header length (8 bits), and a PTS (33+7 bits), which is a total of 112 bits (=14 bytes).

The stream header (4 bytes) contains information that represents audio coding method (linear PCM, MP3 (MPEG1 Audio Layer III), AAC (Advanced Audio Coding), ATRAC3 (Adapive Transform Acoustic Coding 3, or the like), a bit rate (64 Kbps or the like), the number of channels (monaural, stereo, 5.1 channels, or the like), and so forth.

Bit numbers are added to 32 bytes (=256 bytes) of the pack header, the PES header, and the stream header to define bit positions. When the top bit is bit 0, the pack header is from bit 0 to bit 111; the PES header is from bit 112 to bit 223; and the stream header is from bit 223 to bit 255. In the PES header, the scramble control bits of the flag and control are from bit 162 to bit 163. The scramble control bits have been defined as "00"=non-scrambled; "01"=scrambled; and "10" and "11"=reserved (not defined).

The two-bit control code of bit 32 and bit 33 of the pack header is "00" has been defined as "00"=MPEG1 system; and "01"=MPEG2 system. In the MPEG1 system, no scramble control bits are used. As the IV necessary for encryption, the SCR of the pack header, the PTS of the PES header, or the like is used.

FIG. 3A shows the data structure for one sector in a conventional data format (that means the data format of a conventional application other than the MPEG systems). Assuming that encrypting is performed with the IV in the CBC (Chaining Block Ciphering) mode (normally mostly, a process in the unit of eight bytes), the top eight bytes contain data of the scramble control, the IV, and so forth. For example, four bytes are used as the IV. 2040 bytes of which the sector header is excluded form one sector are user data. In other words, the user data is composed of 2040 bytes. When the user data is divided in the unit of eight bytes, it contains data D1 to D255.

It is preferred to allow for example a personal computer, an optical disc drive, and application software (hereinafter referred to as drive and so forth) to deal with both the data format corresponding to the forgoing MPEG2 system and the conventional data format shown in FIG. 3A. For example, conventional application data is dealt with the conventional data format, whereas audio and video data are dealt with data corresponding to the MPEG2 system. When audio and video data are in a data format corresponding to the MPEG2 system, the audio data and the video data can be multiplexed with data of the conventional application. For example, sound and a song text image can be recorded at a time. With the PTS, which is a time stamp, even if data has been compression-encoded with a variable length code, the data can be accessed at high speed.

When two different data formats are used, the drive and so forth may identify the data formats and selectively access data thereof. In this method, however, it is difficult for the drive and so forth to identify the two different formats. To judge whether data has been encrypted in the unit of a sector, the drive and so forth should look up bits at different positions corresponding to the MPEG2 system and the conventional data format. Thus, it is difficult for the drive and so forth to judge whether data has been encrypted in the unit of a sector.

As another method, two different data formats are merged. In this method, such a problem about the selection of the formats does not arise. FIG. 3B shows the data structure in the case that the conventional data format is fit to the MPEG2 system. In the MPEG2 system, the top 32 bytes are a pack header, a PES header, and a stream header as shown in FIG. 2A. Information (scramble control bits and IV) contained in the sector header (eight byes) in the conventional data format can be composed of 32 bytes. However, although the conventional data format needs a header of only eight bytes, the format corresponding to the MPEG2 system needs a header of 32 bytes. Thus, (32−8=24 bytes) are wasted. In other words, the user data of one sector is decreased from 2040 bytes to 2016 bytes. In addition, to fix the positions of the scramble control bits in the MPEG2 system, the stuffing byte cannot be used.

On the other hand, when the MPEG2 system is fit to the conventional data format, as shown in FIG. 3C, a header of eight bytes is added at the beginning of one sector in the data format of the MPEG2 system. As a result, no problem will arise in applications corresponding to other than the MPEG2 system format. However, in applications corresponding to the MPEG2 system, the top eight bytes will be wasted.

Therefore, an object of the present invention is to provide a data outputting method, a recording method and apparatus, a reproducing method and apparatus, and a data transmitting method and receiving method that prevent data from being wasted and user data from being decreased and that allow data structures of different systems to be merged.

DISCLOSURE OF THE INVENTION

To accomplish the forgoing object, an aspect of the present invention is a data outputting method, comprising the steps of converting input data into sector unit data that starts with a start code and a header preceded by the start code, the header being composed of two bits at least one of which is a bit that represents an encryption control; when the converted data is to be encrypted, setting at least one of the two bits preceded by the start code to a state that represents that the data has been encrypted; encrypting the converted data; and encoding the encrypted data and outputting the encoded data.

Another aspect of the present invention is a recording method, comprising the steps of converting input data into sector unit data that starts with a start code and a header preceded by the start code, the header being composed of two bits at least one of which is a bit that represents an encryption control; when the converted data is to be encrypted, setting at least one of the two bits preceded by the start code to a state that represents that the data has been encrypted; encrypting the converted data; and performing an encoding process for the encrypted data and recording the encoded data on a recording medium.

A further aspect of the present invention is a recording apparatus, comprising a converting portion for converting input data into sector unit data that starts with a start code and a header preceded by the start code, the header being composed of two bits at least one of which is a bit that represents an encryption control; a setting portion for setting at least one of the two bits preceded by the start code to a state that represents that the data has been encrypted when data converted by the converting portion is to be encrypted; an encrypting process portion for performing an encrypting process for output data of the setting portion; an encoding process portion for performing an encoding process for output data of the encrypting process portion so that the output data is recorded; and a recording portion for recording output data of the encoding process portion to a recording medium.

A still further aspect of the present invention is a reproducing method, comprising the steps of decoding data that has been read from a recoding medium on which sector unit data had been recorded, the sector unit data being composed of user data, a start code, and a header, the sector unit data starting with the start code and the header preceded by the start code, the header being composed of two bits, at least one of which represents an encryption control; detecting at least one of the two bits preceded by the start code of the decoded data; when the detected result represents that the decoded data has been encrypted, decrypting the decoded data; and converting the decrypted data as the sector unit data into predetermined unit data and outputting the predetermined unit data.

A still further aspect of the present invention is a reproducing apparatus, comprising a decoder for decoding data that has been read from a recoding medium on which sector unit data had been recorded, the sector unit data being composed of user data, a start code, and a header, the sector unit data starting with the start code and the header preceded by the start code, the header being composed of two bits, at least one of which represents an encryption control; a detecting portion for detecting at least one of the two bits preceded by the start code of output data of the decoder; a decrypting portion for decrypting the output data of the decoding portion when the detected result of the detecting portion represents that the decoded data has been encrypted; and a converting portion for converting output data of the decrypting portion as the sector unit data into predetermined unit data and outputting the predetermined unit data.

A still further aspect of the present invention is a data transmitting method, comprising the steps of converting input data into sector unit data that starts with a start code and a header preceded by the start code, the header being composed of two bits at least one of which is a bit that represents an encryption control; when the converted data is to be encrypted, setting at least one of the two bits preceded by the start code to a state that represents that the data has been encrypted; encrypting the converted data; and performing an encoding process for the encrypted data and transmitting the encoded data.

A still further aspect of the present invention is a data receiving method, comprising the steps of receiving sector unit data composed of user data, a start code, and a header, the sector unit data starting with the start code and the header preceded by the start code, the header being composed of two bits, at least one of which is a bit that represents an encryption control; decoding the received data; detecting at least one of the two bits preceded by the start code of the decoded data; when the detected result represents that the decoded data has been encrypted, decrypting the decoded data; and converting the decrypted data as the sector unit data into predetermined unit data.

Since two bits at predetermined positions are used for an encryption control, two different systems for example MPEG2 system and conventional application can be merged without waste and inconsistency of data. Moreover, an encryption control can be performed in the unit of a sector. Furthermore, in the MPEG1 system, which does not define scramble control bits, an encryption control can be performed. As a result, the security of contents in the MPEG1 format can be protected. In addition, since the positions of the encryption initial values of these data formats are the same, the same encrypting system can be used. After data has been decrypted, the decrypted data can be used as data corresponding to the MPEG1 system and the MPEG2 system. Since the MPEG systems place encryption control bits at fixed positions preceded by a stuffing byte, it can be used.

BRIEF DESCRIPTION OF DRAWINGS

FIG. 2 is a schematic diagram showing an example of the data structure corresponding to the MPEG2 system;

FIG. 3A is a schematic diagram showing the data structure of one sector in a data format of a conventional application;

FIG. 3B is a schematic diagram showing the data structure in the case the data format of the conventional application is fit to the MPEG2 system;

FIG. 3C is a schematic diagram showing the data structure in the case that the MPEG2 system is fit to the data format of the conventional application;

FIG. 5A is a schematic diagram showing an example of a definition of encryption control bits according to an embodiment of the present invention;

FIG. 5B is a schematic diagram showing another example of the definition of the encryption control bits according to an embodiment of the present invention;

FIG. 6 is a block diagram showing a recording apparatus and a transmitting apparatus according to an embodiment of the present invention;

BEST MODES FOR CARRYING OUT THE INVENTION

Next, an embodiment of the present invention will be described. At first, with reference to FIG. 4A to FIG. 4C, a data format according to the embodiment will be described.

Figure 1A:
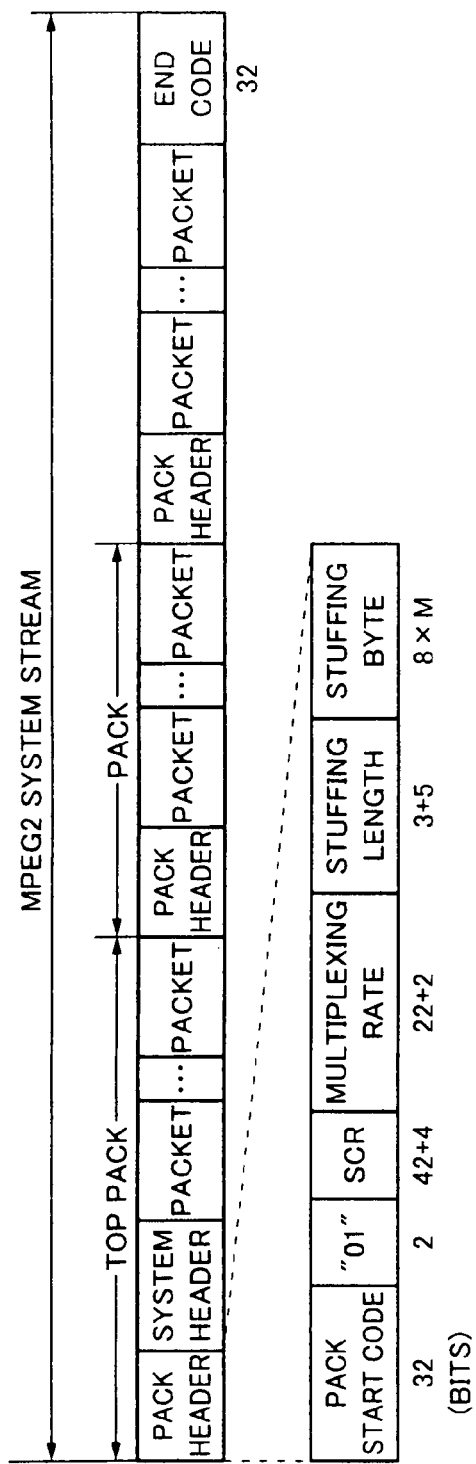
FIG. 1A is a schematic diagram showing the data structure of a program stream corresponding to the MPEG2 system according to the present invention.
Figure 1B:
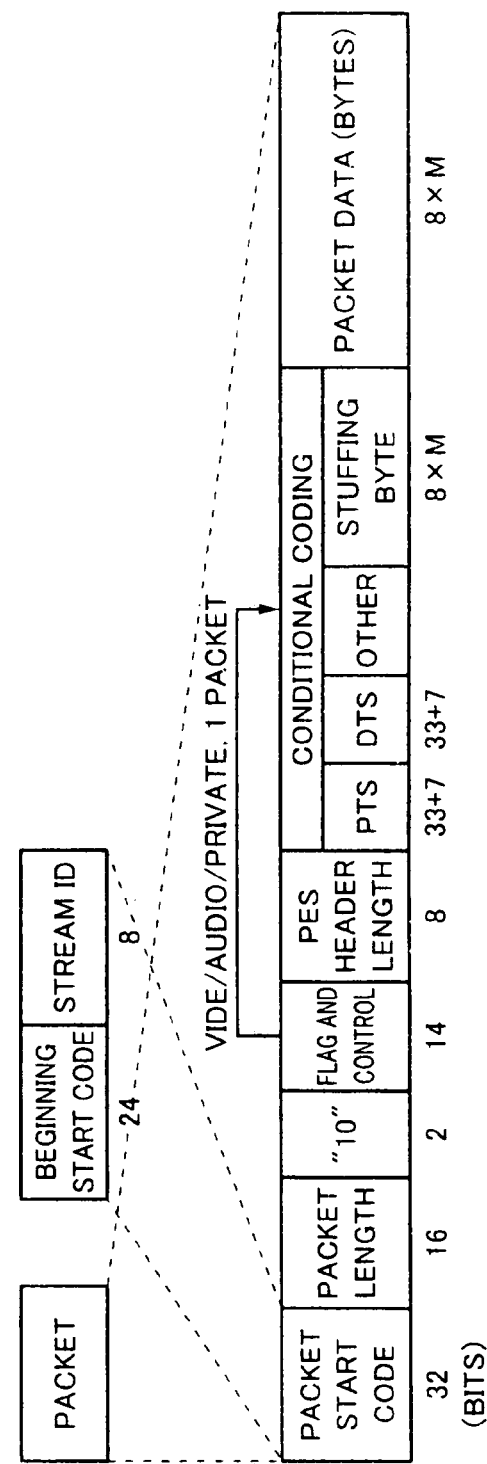
FIG. 1B is a schematic diagram showing the structure of a packet corresponding to the MPEG2 system according to the present invention.
Figure 4A:
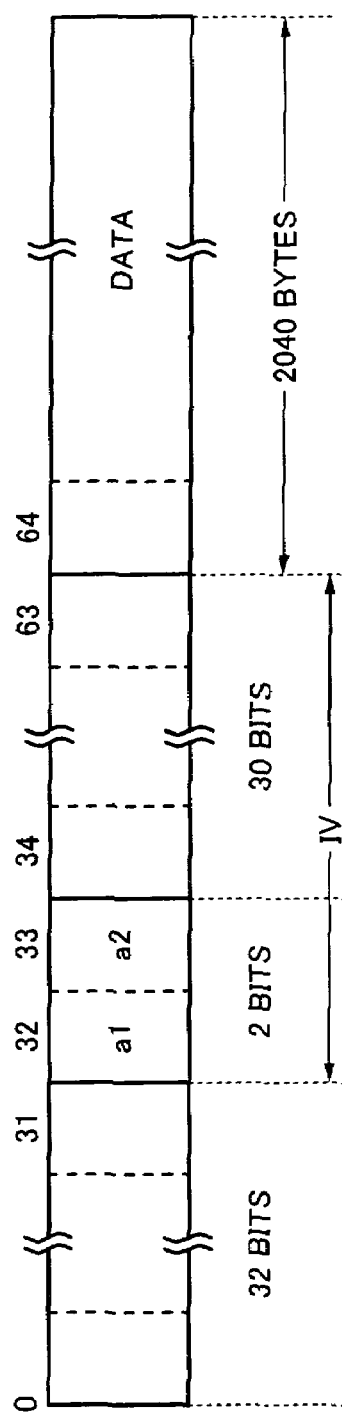
FIG. 4A is a schematic diagram showing the data structure (for example, one sector is composed of 2 Kbytes) according to an embodiment of the present invention.

FIG. 4A shows an example of which one sector is composed of 2 Kbytes (2048 bytes). However, 2 Kbytes is just an example. In other words, one sector may be composed of other than 2 Kbytes. In the top eight bytes (bit 0 to bit 63) of one sector, two bits of bit 32 (denoted by a1) and bit 33 (denoted by a2) are used as an encryption control code. The two bits a1 and a2, which are a control code, and the remaining 30 bits, which is a total of 32 bits, are used as an IV. With the IV, the data after bit 64 is encrypted in the CBC mode. However, data after any bit other than bit 64 (for example, data after bit 128) may be encrypted.

Figure 4B:
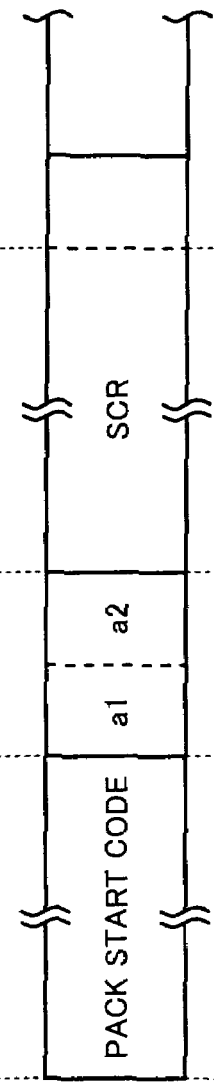
FIG. 4B is a schematic diagram showing a part of the data structure in the case that the present invention is applied to the MPEG2 system.

FIG. 4B shows a part of the data structure in the case that the present invention is applied to the MPEG2 system. In other words, as was described with reference to FIG. 2, the top 32 bits correspond to the pack start code. The 32 bits are followed by the control code (a1 and a2). The control code (a1 and a2) is followed by an SCR of (42+2) bits. Thus, the control code is used for a scramble control. The IV is composed of 30 bits of the SCR. Data after bit 64 is encrypted with the IV. The size of the user data is 2016 bytes as with the case shown in FIG. 2.

In the MPEG2 system, scramble control bits are assigned to bits 162 and 163. The scramble control bits have been defined as "00"=non-scrambled; "01"=scrambled; and "10" and "11"=reserved (not defined). When the control code (a1 and a2) is are used for an encryption control according to the embodiment, it has been prescribed that information of the control code should not be inconsistent with information of the scramble control bits. Alternatively, the information of the control code has the precedence over the other. In other words, when the control code represents scrambled, this state is used regardless of the scramble control bits.

Figure 4C:
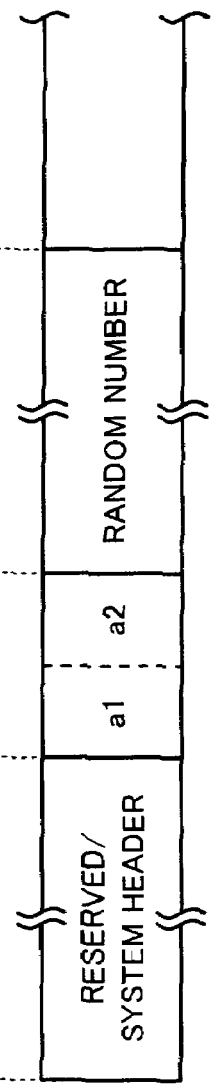
FIG. 4C is a schematic diagram showing a part of the data structure in the case that the present invention is applied to the conventional data format other than the MPEG2 system.

FIG. 4C shows an example of the case that the present invention is applied to the conventional data format other than the MPEG systems. The top 32 bits are reserved or used as a system header. The 32 bits are followed by a two-bit control code a1 and a2. The remaining 30 bits are a random number generated by hardware or software. The control code a1 and a2 and the random number correspond to the IV. However, when the IV needs the length of 64 bits, two sets of 32 bits from bit 32 to bit 63 or data from bit 0 to bit 63 may be used. Data after bit 64 is user data. As with the data structure shown in FIG. 3A, the size of the user data is 2040 bytes.

FIG. 5 shows two examples of the definition of the two-bit control code (a1 and a2). In the example shown in FIG. 5A, to identify MPEG1 and MPEG2, two bits are used. "a1 a2"="0 1" has been defined as non-encrypted in the MPEG1 system. "a1 a2"="0 1" has been defined as non-encrypted in the MPEG2 system. They comply with the definition of the MPEG. "a1 a2"="1 0" has been defined as encrypted in the MPEG1 system. "a1 a2"="1 1" has been defined as encrypted in the MPEG2 system. When the MPEG1 system is not used, "a1 a2"="0 0" and "a1 a2"="1 0" may be undefined (reserved).

Only bit 32 (a1) may be used for an encryption control. In this case, "a1 a2"="0 0" is defined as non-encrypted in the MPEG1 system. "a1 a2"="0 1" is defined as non-encrypted in the MPEG2 system. "1x" (where x represents one of "0" and "1") is defined as encrypted.

In the other example shown in FIG. 5B, two bits are used for an encryption control. "a1 a2"="0 0" is defined as reserved. "a1 a2"="0 1" is defined as non-encrypted. "a1 a2"="1 0" is defined as encrypted in the second encrypting method. "a1 a2"="1 1" is defined as an encryption in the first encrypting method, which is different from the second encrypting method. In the first and second encrypting methods, encrypting keys or encrypting methods are different. As a method for causing encrypting keys to be different, a key Ka in the first encrypting method is Hash-calculated and thereby a key Kb in the second encrypting method is obtained. Alternatively, keys which do have no relation at all may be used.

Different encrypting methods are used for different contents types. For example, the encrypting method used for trial listening contents is different from that used for contents to be-charged. The key Ka in the forgoing example is used for decrypting data of contents to be charged. The key Kb is used for decrypting data of trial listening contents. Although the data of the key Kb can be generated by a Hash calculation for the key Ka, the data of the key Ka cannot be generated by a Hash calculation of the key Kb because the Hash function is unidirectional.

In the example shown in FIG. 5B, when the two bits "a1a2" represents encrypted, when encrypted data is decrypted, the two bits are changed to a value that represents non-encrypted. In the MPEG1 system, when data of contents is decrypted, "a1 a2" is rewritten to "0 0". In the MPEG2 system, when data of contents is decrypted, "a1 a2" is rewritten to "0 1". The reserved two bits may represent a third encrypting method.

Next, with reference to FIG. 6, an embodiment of a recording apparatus and a transmitting apparatus according to the present invention will be described. In FIG. 6, the recording apparatus and the transmitting apparatus are illustrated on the same drawing. However, they are normally structured as independent systems. Referring to FIG. 6, reference numerals 1*a*, 1*b*, and 1*c* represent input terminals to which video data, audio data, and text data are input. When necessary, these data are compressed data. They are delimited in the data length of a packet.

The data that are input from the input terminals 1*a* to 1*c* are time-division multiplexed by a multiplexer 2. The multiplexed data is supplied to an MPEG judging portion 3. The MPEG judging portion 3 decides the system to be used. The MPEG judging portion 3 decides the system to be used corresponding to for example user's selection, the judgment of the application software, the control information in association with the input data, and so forth.

When the judged result of the MPEG judging portion 3 represents that the MPEG1 system is to be used, the multiplexed data is supplied to an MPEG1 system converting portion 4. When the judged result of the MPEG judging portion 3 represents that the MPEG2 system is to be used, the multiplexed data is supplied to an MPEG2 system converting portion 5. When the judged result of the MPEG judging portion 3 represents that the conventional application is to be used, the multiplexed data is supplied to a random number generating portion 6. As shown in FIG. 4C, the random number generating portion 6 generates output data of a data structure of which reserved or system header, two bits, and a random number have been added to each sector.

The MPEG1 system converting portion 4 converts the multiplexed data into a data structure corresponding to the MPEG1 system. The MPEG2 system converting portion 5 converts the multiplexed data into a data structure corresponding to the MPEG2 system of which a pack header (a pack start code, two bits, an SCR, a multiplexing rate, and a stuffing length), a PES header, and a stream header have been added to each pack (sector) as shown in FIG. 2 and FIG. 4B. Although the data structure corresponding to the MPEG1 system is almost same as that shown in FIG. 4B, the former data structure does not contain scramble control bits.

Output data of the MPEG1 system converting portion 4, the MPEG2 system converting portion 5, and the random number generating portion 6 are supplied to an encryption judging portion 7. The encryption judging portion 7 judges which of output data of the MPEG1 system converting portion 4, the MPEG2 system converting portion 5, and the random number generating portion 6 is to be encrypted. When a plurality of encrypting methods are provided, the encryption judging portion 7 selects one from the plurality of encrypting methods. The encryption judging portion 7 judges whether to encrypt data corresponding to a selection by the user (for example, contents creator), a judgment by application software, a command of an authoring system, control information in association with input data, and so forth.

When the judged result represents that the data is to be encrypted, output data of the encryption judging portion 7 is supplied to a bit setting circuit 8. The bit setting circuit 8 outputs data in which a1 ="1" has been set. The data in which a1="1" has been set is supplied to an encrypter 9. The encrypter 9 encrypts the data. The encrypter 9 encrypts data after bit 64 in the data structure shown in FIG. 4B and FIG. 4C. The encrypter 9 encrypts the data in the CBC mode with an IV (initial value). In the MPEG1 and MPEG2 systems, the IV is a part of the SCR. In the conventional data format, the IV is a random number generated by the random number generating portion 6. As shown in FIG. 5A, the data in which a1="1" has been set by the bit setting circuit 8 represents that the data of the sector has been encrypted. When the judged result of the encryption judging portion 7 represents that the data is not to be encrypted, the output data of the encryption judging portion 7 is supplied to a bit setting circuit 10. The bit setting circuit 10 sets the bit a1 to "0".

The data that has been encrypted by the encrypter 9 or output data of the bit setting circuit 10 is supplied to an error correction code encoding circuit 11. The error correction code encoding circuit 11 encodes the data with an error correction code. Output data of the error correction code encoding circuit 11 is supplied to a modulating circuit 12.

In the recording apparatus, output data of the modulating circuit 12 is supplied to an optical pickup 14 through a recording amplifier 13. The optical pickup 14 records the data on an optical disc 15. The optical pickup 14 is traveled in the radial direction of the optical disc 15 by a feed motor (not shown). The optical disc is a recordable optical disc. The optical disc 15 is rotated and driven at constant linear velocity or constant angular velocity by a spindle motor 16. In the recording apparatus, a tracking servo and a focusing servo for the optical pickup 14 and a servo circuit (not shown) that controls the rotation of the spindle motor 16 are disposed.

The optical disc 15 according to the embodiment is a phase change type disc. In the phase change type disc, when laser light in a sufficient output level is radiated to the optical disc 15, data can be recorded thereon. When the variation of the light amount of the laser light reflected by the optical disc 15 is detected, the data recorded on the optical disc 15 can be reproduced. The material of a substrate on which a recording film composed of a phase change recording material of the optical disc 15 is coated is for example polycarbonate. The polycarbonate has been injection molded so that track guide grooves simply referred to as grooves have been formed. Since the grooves formed on the disc substrate have been formed, they are also referred to as pre-grooves. A portion between two grooves is referred to as land. Normally, it is prescribed that the near side viewed from the incident side of read laser light is a groove and that the far side thereof is a land. The grooves have been successively and spirally formed from the inner circumference to the outer circumference. In addition, as long as the disc is recordable, the present invention can be applied to not only a phase change type optical disc such as a CD-RW disc, but a magneto-optical disc and a write-once type disc such as a CD-R disc, which uses an organic coloring matter as a recording material.

The grooves have been wobbled in the radial direction of the optical disc 15 so that they are used as a reference signal for controlling the rotation of the optical disc 15 and for recording data thereon. Data is recorded in-grooves or at grooves and lands of the optical disc 15. In addition, the grooves have been wobbled in the radial direction of the optical disc 15 so as to successively record absolute time information and clock as address information. In the CD-R disc and the CD-RW disc, with reference to the absolute time information as the address information of which the grooves wobbled in the radial direction of the disc have been optically detected, the optical pickup 14 is traveled to a desired data write position on the optical disc 15. Laser light is radiated from the optical pickup 14 to the optical disc 15. As a result, data is written at the desired position of the optical disc 15.

The optical disc having wobbled grooves is produced in the following manner. A mastering apparatus radiates laser light on a photo resist film coated on a glass master disc and deflects or swings the laser light in the radial direction of the glass master disc. As a result, wobbled grooves are formed. The photo resist film exposed by the radiation of the laser light is developed. As a result, a maser disc is produced. An electroforming process is performed for the maser disc. As a result, a stamper is produced. With the stamper, injection molding is performed. As a result, a disc substrate having wobbled grooves is formed. A phase change recording material is coated on the groove-formed surface of the disc substrate by for example spattering method. As a result, the optical disc 15 is produced.

Alternatively, the recording apparatus shown in FIG. 6 may be accomplished by a drive (hardware) and a personal computer (software) besides dedicated hardware. The structure downstream of the error correction code encoding circuit 11 is hardware (a drive such as a CD-R drive or a CD-R/W drive). The rest can be accomplished by software executed by a microcomputer or the like as a controller. In the recording apparatus, as an example of the physical format, the CD-ROM mode 2, form 1 is used. As the file management system, the UDF (Universal Disc Format) is used. As the application, the MPEG1 system, the MPEG2 system, or the conventional application is used. When a different application is used, as was described with reference to FIG. 4A to FIG. 4C, data is recorded in the merged data format on the optical disc or transmitted.

In the transmitting apparatus, output data of the modulating circuit 12 is supplied to a transmitting antenna 18 through a transmitting amplifier 17. A signal is transmitted from the transmitting antenna 18 to for example a communication satellite. As another transmitting method other than the method using a communication satellite, the present invention can be applied to the case that output data is transmitted from the modulating circuit 12 through the internet.

Figure 7:
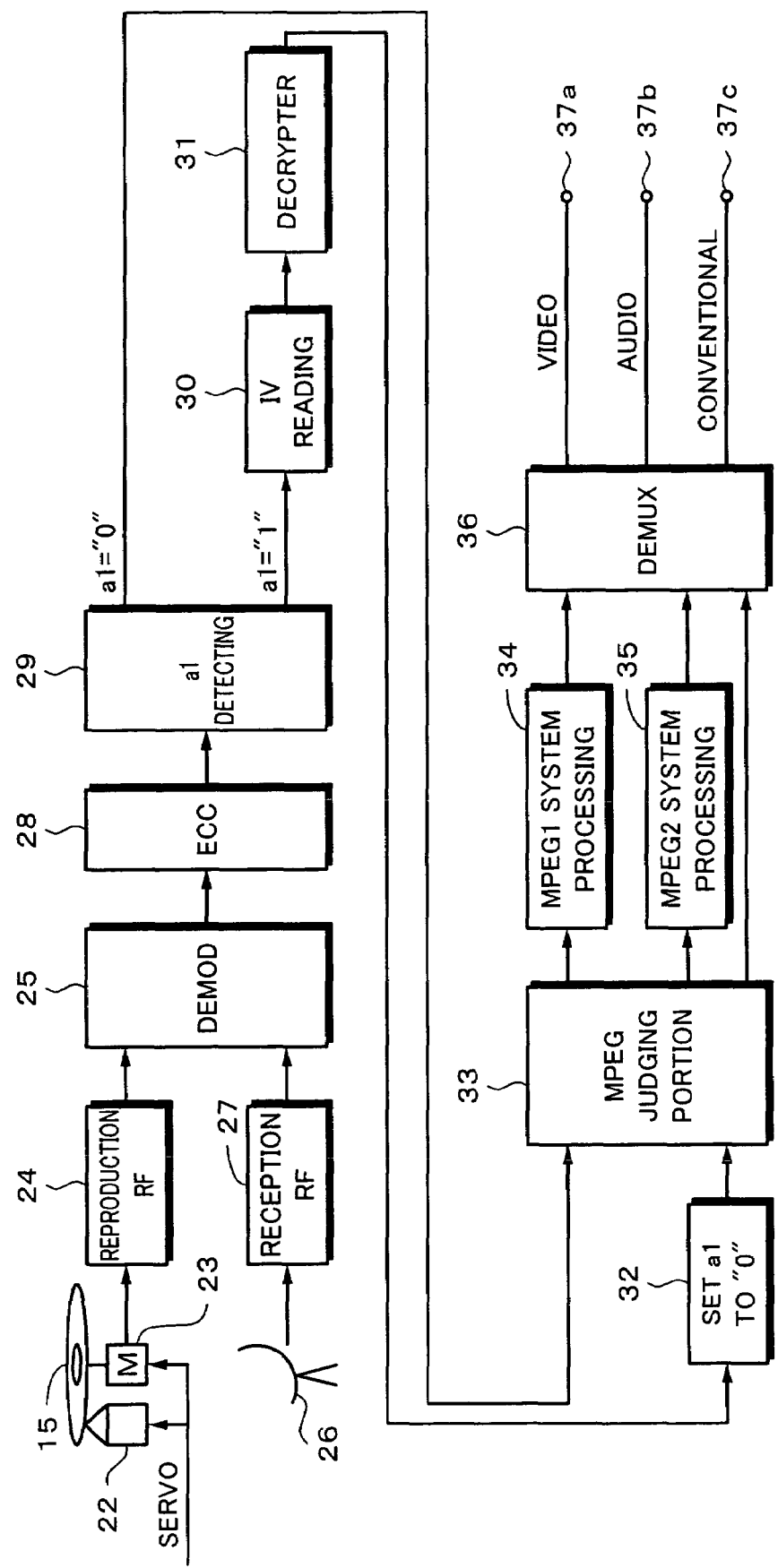
FIG. 7 is a block diagram showing a reproducing apparatus and a receiving apparatus according to an embodiment of the present invention.

FIG. 7 shows a reproducing apparatus and a receiving apparatus according to an embodiment of the present invention. As with the recording apparatus, the reproducing apparatus is composed of a disc drive (a CD-ROM drive, a CD-R drive, a CD-RW drive, or the like), which is structured as hardware, and application software, which is executed by a controller. Alternatively, the reproducing apparatus shown in FIG. 7 may be structure as hardware.

In FIG. 7, an optical disc 15 is rotated by a spindle motor 22. An optical pickup 23 reads data from the optical disc 15. Laser light necessary for reproducing data is radiated from the optical pickup 23 to the optical disc 15. A four-divided photo-detector disposed on the optical pickup 23 detects laser light reflected by the optical disc 21. A signal detected by the photo-detector as an output signal is supplied to a reproduction RF processing portion 24.

The reproduction RF processing portion 24 calculates the detected signal of the photo-detector by a matrix amplifier disposed therein and generates a reproduction (RF) signal, a tracking error signal, and a focus error signal. When clock and addresses have been recorded as wobbled grooves, a signal of which the wobbled grooves have been detected is output from the reproduction RF processing portion 24. An RF signal generated by the reproduction RF processing portion 24 is supplied to a demodulating portion 25. The demodulating portion 25 performs for example an EFM demodulating process corresponding to the supplied RF signal.

In the receiving apparatus, a signal received by a receiving antenna 26 is supplied to a reception RF processing portion 27. The reception RF processing portion 27 performs a frequency converting process and so forth. An output signal of the reception RF processing portion 27 is supplied to the demodulating portion 25. The demodulating portion 25 performs a demodulating process for the signal. Output data of the demodulating portion 25 is supplied to an error correcting circuit 28. The error correcting circuit 28 performs an error detecting and error correcting process.

A tracking error signal and a focus error signal generated by the reproduction RF processing portion 24 are supplied to a servo circuit (not shown). The servo circuit controls the rotation of the spindle motor 22 and tracking and focus of the optical pickup 23. The servo circuit performs a tracking servo and a focus servo for the optical pickup 23, a spindle servo for the spindle motor 22, and a thread servo for traveling the optical pickup 23 in the radial direction of the optical disc 15.

Data that has been error-corrected by the error correcting circuit 28 is supplied to a bit detecting circuit 29. The bit detecting circuit 29 judges whether bit a1 is "0" or "1". When the detected result of the bit detecting circuit 29 represents that a1="1", since the reproduction data, which is output data of the error correcting circuit 28, has been encrypted, the reproduction data is supplied to an IV reading portion 30. As shown in FIG. 4A to FIG. 4C, since the position of the IV of the reproduction data is fixed, the IV reading portion 30 can easily read the IV.

The IV that has been read by the IV reading portion 30 and the encrypted data are supplied to a decrypter 31. The decrypter 31 performs a process for decrypting encrypted data (namely, a decrypting process). Output data (namely, decrypted data) of the decrypter 31 is supplied to a bit setting circuit 32. The bit setting circuit 32 sets bit a1 of the data which is output from the decrypter 31 to "0", which represents non-encrypted. The resultant two bits of which bit a1 has been set to "0" comply with the rule of the MPEG2 system. The data, of which bit a1 has been set to "0" by the bit setting circuit 32, is supplied to an MPEG judging portion 33. When the detected result of the bit detecting circuit 29 represents that bit a1 is "0", since output data of the error correcting circuit 28 has not been encrypted, the data is supplied to the MPEG judging portion 33 as it is.

The MPEG judging portion 33 judges whether the input data corresponds to the MPEG1 system, the MPEG2 system, or the conventional application. The judgment of whether the input data corresponds to the MPEG1 system or the MPEG2 system is performed depending on whether the data contains scramble control bits. On the other hand, the judgment of whether the input data corresponds to the conventional application is performed depending on whether or not the portion of the SCR is a random number. When the input data corresponds to the MPEG1 system, the reproduction data is processed by an MPEG1 system processing portion 34. When the input data corresponds to the MPEG2 system, the reproduction data is processed by an MPEG2 system processing portion 35. The MPEG1 system processing portion 34 and the MPEG2 system processing portion 35 perform respective decoding processes for data corresponding to the respective systems and output video data and audio data, which have been delimited by packs.

When the judged result of the MPEG judging portion 33 represents that the input data corresponds to the conventional application, the data is supplied to a demultiplexer 36 as it is. Video data and audio data, which have been processed by the MPEG1 system processing portion 34 or the MPEG2 system processing portion 35, are supplied to the demultiplexer 36. The demultiplexer 36 groups these data and outputs the grouped data to output terminals 37a, 37b, and 37c.

Figure 8:
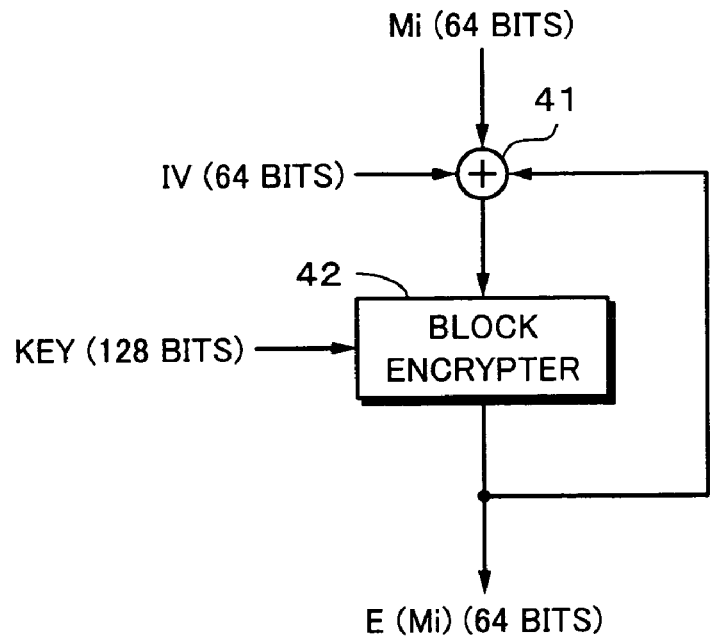
FIG. 8 is a block diagram showing an example of an encrypter according to the present invention.

FIG. 8 shows an example of the encrypter 9 (refer to FIG. 6) in the CBC mode. For example, data Mi delimited every for example 64 bits (eight bytes) is supplied to a mod 2 adding device 41 (for example, an exclusive OR gate). When the top data of one sector is M1, an IV (initial value) is supplied to the adding device 41. An output of the adding device 41 is supplied to a block encrypter 42. The block encrypter 41 is an encrypter that performs an encrypting process corresponding to DES (Data Encryption Standard), AES, triple DES, or the like.

Key data (128 bits) is supplied to the block encrypter 42. The block encrypter 42 encrypts an output of the adding device 41 with the key data. The block encrypter 42 outputs encrypted data E (Mi) (64bits). The encrypted data E (Mi) is output from the block encrypter 42. In addition, the encrypted data E (Mi) is fed back to the adding device 41. The adding device 41 adds the next input data M2 to the encrypted data E (Mi). The same operation is repeated until data for one sector has been processed.

Figure 9:
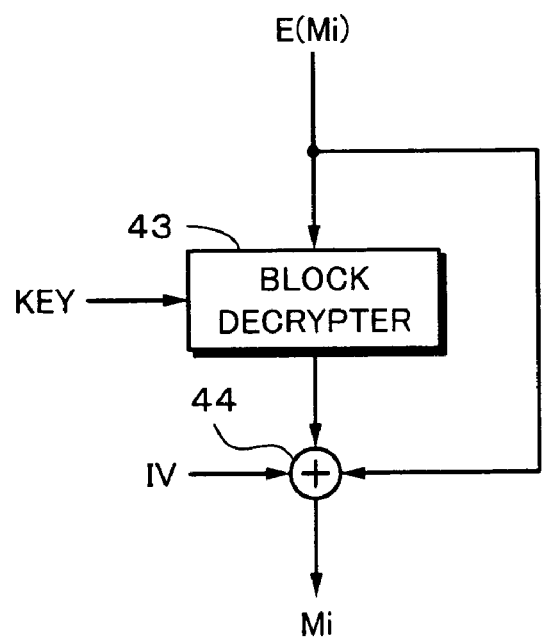
FIG. 9 is a block diagram showing an example of a decrypter according to the present invention.

FIG. 9 shows an example of the structure of the decrypter 31 (refer to FIG. 7) corresponding to the encrypter 9. As was described above, encrypted data E (Mi) is supplied to a block decrypter 43. Key data is supplied to the block decrypter 43. The block decrypter 43 decrypts the data E (Mi). The decrypted data is supplied to a mod 2 adding device 44. At the first time, the adding device 44 adds an IV of the sector and the output data of the block decrypter 43. At the second or later time, the adding device 44 adds the output data of the block decrypter 43 and the input data thereof. The adding device 44 outputs decrypted data Mi.

The present invention is not limited to the forgoing embodiment. Instead, without departing from the scope and sprit of the present invention, various modifications and ramifications are available. For example, in the reproducing apparatus and the receiving apparatus, after data is decrypted, bit a1 is set to "0". Alternatively, without such a process, after data has been decrypted, bit a1 may be ignored. In addition, when the recording method according to the present invention is applied to a read-only optical disc, the recording apparatus shown in FIG. 6 is applied to a mastering apparatus. In addition, the present invention can be applied to not only optical discs, but other data recording mediums such as memory cards.

According to the present invention, in a data format of which data of different systems such as the MPEG system and conventional application have been merged, an encryption control can be performed in the unit of a sector. Thus, it is not necessary to identify data of these two systems and selectively perform the processes. In addition, when data structures are merged, the amount of data that is placed in one sector is not decreased. Thus, efficiency is assured. In addition, as the merged result of data of the systems, they are not inconsistent.

According to the present invention, in each system, an encrypting initial value can be placed at the same position in a sector. Data of different systems can be encrypted and decrypted in the same method. In addition, in the MPEG1 system, which has not defined a scramble control, each sector can contain information of an encryption control. As a result, the security (copyright) of contents can be protected. After encrypted data has been decrypted, when bits are rewritten, the decrypted data can be used in the MPEG1 system and the MPEG2 system. In addition, when stuffing bytes are added, the positions of bits for an encryption control are fixed. As a result, variable length data can be handled.

The invention claimed is:

1. A data outputting method, comprising the steps of:
converting input data into sector unit data that starts with a header including two bits subsequent to a start code wherein at least one bit of the two bits represents an encryption control;
setting at least one of the two bits subsequent to the start code into the sector unit data so as to represent that the data has been encrypted, when the sector unit data is encrypted;
encrypting the converted data;
encoding the encrypted data; and
outputting the encoded data;
wherein data of one sector of the sector unit data is composed of 2048 bytes,
wherein the encrypting step is performed by encrypting data after bit 64,
in which the two bits subsequent to the start code are located in a same position for a plurality of format systems,
wherein the converting step comprises the steps of:
judging whether the input data is to be converted into the sector unit data corresponding to an MPEG encoding rule; and
converting the input data corresponding to the MPEG encoding rule, when the judged result represents that the input data is to be converted into the sector unit data corresponding to the MPEG encoding rule, and
wherein when the judged result represents that the input data is not to be converted into the sector unit corresponding to the MPEG encoding rule, the converting step further comprises the step of:
adding random number data to the sector unit data so that the random number data is followed by the start code and the two bits.

2. A recording method, comprising the steps of:
converting input data into sector unit data that starts with a header including two bits subsequent to a start code wherein at least one bit of the two bits represents an encryption control;
setting at least one of the two bits subsequent to the start code into the sector unit data so as to represent that the data has been encrypted, when the sector unit data is encrypted;
encrypting the converted data; and
performing an encoding process for the encrypted data and recording the encoded data on a recoding medium;
wherein data of one sector of the sector unit data is composed of 2048 bytes,
wherein the encrypting step is performed by encrypting data after bit 64, and in which the two bits subsequent to the start code are located in a same position for a plurality of format systems, wherein the converting step comprises the steps of:

judging whether the input data is to be converted into the sector unit data corresponding to an MPEG encoding rule; and converting the input data corresponding to the MPEG encoding rule, when the judged result represents that the input data is to be converted into the sector unit data corresponding to the MPEG encoding rule, and wherein when the judged result represents that the input data is not to be converted into the sector unit corresponding to the MPEG encoding rule, the converting step further comprises the step of:

adding random number data to the sector unit data so that the random number data is followed by the start code and the two bits.

3. A recording apparatus, comprising:

a converting portion for converting input data into sector unit data that starts with a header including two bits subsequent to a start code wherein at least one bit of the two bits represents an encryption control;

a setting portion for setting at least one of the two bits subsequent to the start code into the sector unit data so as to represent that the data has been encrypted, when the sector unit data is encrypted;

an encrypting process portion for performing an encrypting process on setting portion output data;

an encoding process portion for performing an encoding process for output data to record the encrypting portion output data;

a judging portion for judging whether the input data is to be converted into the sector unit data corresponding to an MPEG encoding rule; and a recording portion for recording encoding portion output data of the encoding process portion to a recording medium;

wherein data of one sector of the sector unit data, which is input by the converting portion, is composed of 2048 bytes, wherein when the data converted by the converting portion is to be encrypted, the encrypting process portion is configured to encrypt data after bit 64 of the converted sector unit data, in which the two bits subsequent to the start code are located in a same position for a plurality of format systems, wherein when the judged result of the judging portion represents that the input data is to be converted into the sector unit data corresponding to the MPEG encoding rule, the converting portion is configured to convert the input data corresponding to the MPEG encoding rule, and wherein when the judged result of the judging portion represents that the input data is not to be converted into the sector unit corresponding to the MPEG encoding rule, the converting portion is configured to add random number data to the sector unit data so that the random number data is followed by the start code and the two bits.

4. A data transmitting method, comprising the steps of:

converting input data into sector unit data that starts with a header including two bits subsequent to a start code wherein at least one bit of the two bits represents an encryption control;

setting at least one of the two bits subsequent to the start code into the sector unit data so as to represent that the data has been encrypted, when the sector unit data is encrypted;

encrypting the converted data; and performing an encoding process for the encrypted data and transmitting the encoded data;

wherein data of one sector of the sector unit data is composed of 2048 bytes, wherein the encrypting step is performed by encrypting data after bit 64 of the sector unit, in which the two bits subsequent to the start code are located in a same position for a plurality of format systems, wherein the converting step comprises the steps of:

judging whether the input data is to be converted into the sector unit data corresponding to an MPEG encoding rule; and converting the input data corresponding to the MPEG encoding rule, when the judged result represents that the input data is to be converted into the sector unit data corresponding to the MPEG encoding rule, and wherein when the judged result represents that the input data is not to be converted into the sector unit corresponding to the MPEG encoding rule, the converting step further comprises the step of:

adding random number data to the sector unit data so that the random number data is followed by the start code and the two bits.

* * * * *